US012607419B2

(12) United States Patent　(10) Patent No.:　US 12,607,419 B2

Toubiana　(45) Date of Patent:　Apr. 21, 2026

(54) PLATE HEAT EXCHANGER COMPRISING PROFILED GUIDE ELEMENTS

(71) Applicant: SAFRAN, Paris (FR)

(72) Inventor: Ephraim Toubiana, Moissy-Cramayel (FR)

(73) Assignee: SAFRAN, Paris (FR)

( * ) Notice: Subject to any disclaimer, the term of this patent is extended or adjusted under 35 U.S.C. 154(b) by 423 days.

(21) Appl. No.: 18/257,243

(22) PCT Filed: Dec. 15, 2021

(86) PCT No.: PCT/FR2021/052336

§ 371 (c)(1),
(2) Date: Jun. 13, 2023

(87) PCT Pub. No.: WO2022/129785

PCT Pub. Date: Jun. 23, 2022

(65) Prior Publication Data

US 2024/0044592 A1　Feb. 8, 2024

(30) Foreign Application Priority Data

Dec. 17, 2020　(FR) ...................................... 2013527

(51) Int. Cl.
F28D 9/00　(2006.01)
F02C 7/14　(2006.01)
(Continued)

(52) U.S. Cl.
CPC .............. F28F 9/0268 (2013.01); F02C 7/14 (2013.01); F28D 9/0062 (2013.01);
(Continued)

(58) Field of Classification Search
CPC ............ F28D 9/0062; F28D 2021/0021; F28F 9/0265; F28F 9/0268; F28F 2250/02
See application file for complete search history.

(56) References Cited

U.S. PATENT DOCUMENTS

| | | | | |
|---|---|---|---|---|
| 2012/0227949 A1* | 9/2012 | Weber | .................. | F28D 9/0062 |
| | | | | 165/185 |
| 2013/0168045 A1* | 7/2013 | Schmid | ................. | F28D 9/0062 |
| | | | | 165/96 |
| 2019/0285349 A1 | 9/2019 | Streeter et al. | | |

FOREIGN PATENT DOCUMENTS

| | | |
|---|---|---|
| DE | 19644711 A1 | 4/1998 |
| DE | 19943389 A1 | 11/2000 |

(Continued)

OTHER PUBLICATIONS

International Search Report received for PCT Patent Application No. PCT/FR2021/052336, mailed on Apr. 7, 2022, 7 pages (3 pages of English Translation and 4 pages of Original Document).

*Primary Examiner* — Eric S Ruppert

(74) *Attorney, Agent, or Firm* — WOMBLE BOND DICKINSON (US) LLP

(57) ABSTRACT

A plate heat exchanger, in particular for an aircraft turbo machine, between a first fluid and a second fluid, the first fluid being intended to circulate in a first direction and the second fluid being intended to circulate in a second direction different from the first direction, the heat exchanger having stacked stages for circulation of the first fluid, and profiled elements at the inlet and outlet of the stages, the profiled elements having a sawtooth-shaped cross-section and defining channels converging at the inlet of the stages and diverging at the outlet of the stages.

14 Claims, 5 Drawing Sheets

(51) Int. Cl.
*F28F 9/02* (2006.01)
*B33Y 80/00* (2015.01)
*F28D 21/00* (2006.01)

(52) U.S. Cl.
CPC ............. *F28F 9/0282* (2013.01); *B33Y 80/00* (2014.12); *F05D 2260/213* (2013.01); *F28D 2021/0021* (2013.01); *F28F 2250/106* (2013.01)

(56) References Cited

FOREIGN PATENT DOCUMENTS

| | | | |
|----|-----------|----|--------|
| FR | 0918616 | A | 2/1947 |
| FR | 3077630 | A1 | 8/2019 |
| GB | 0634608 | A | 3/1950 |

* cited by examiner

[Fig.1]
[Fig.2]
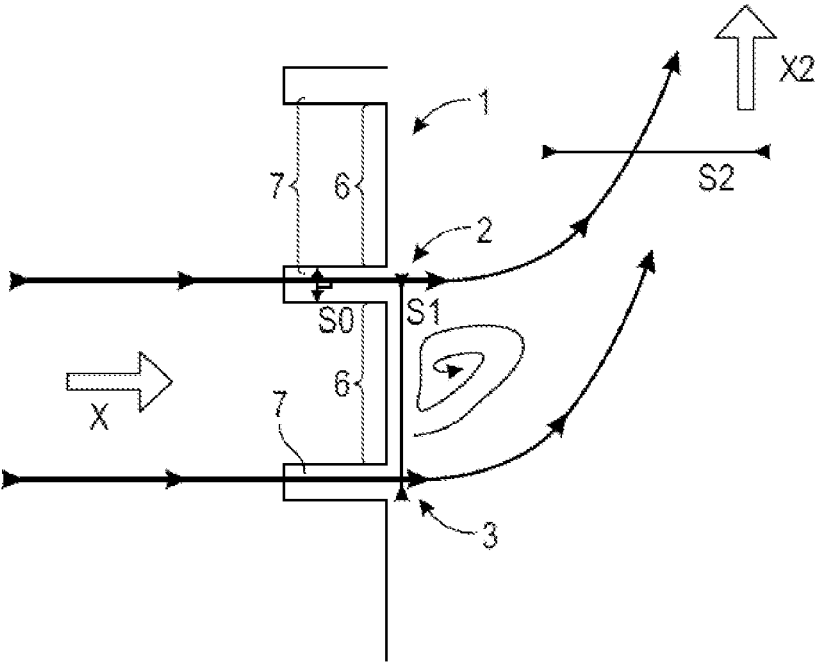

[Fig.3]
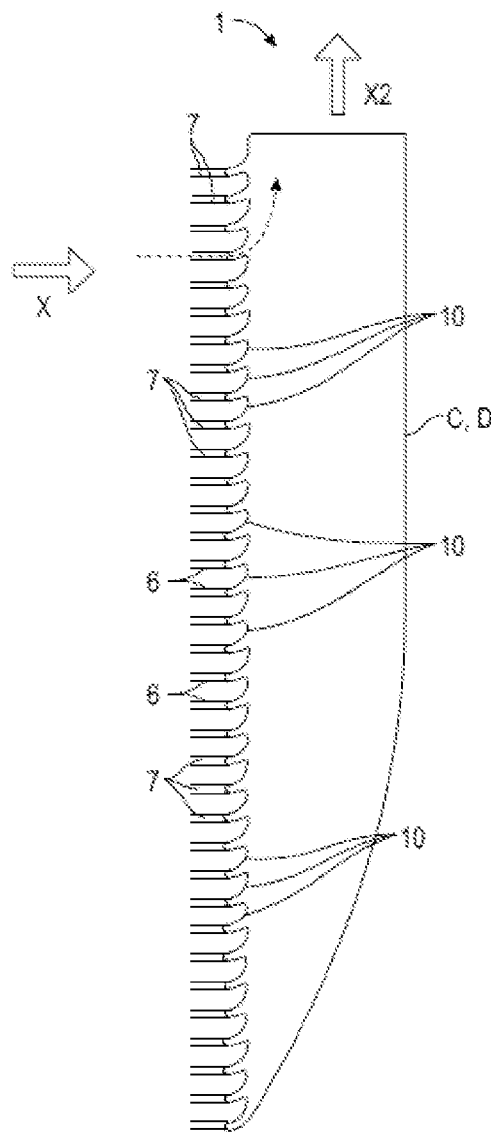

[Fig.4]
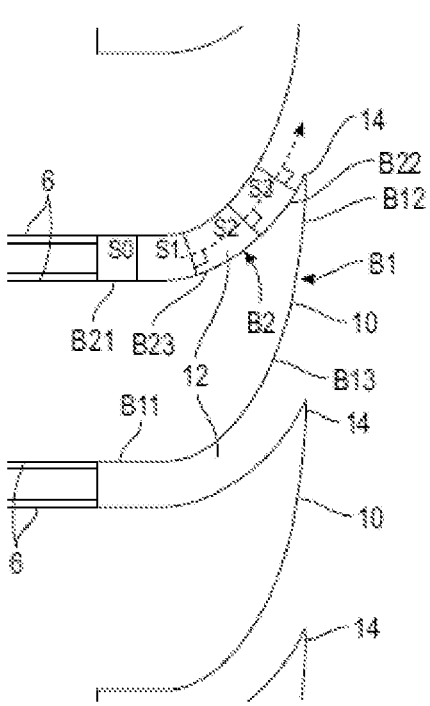

[Fig.5a]
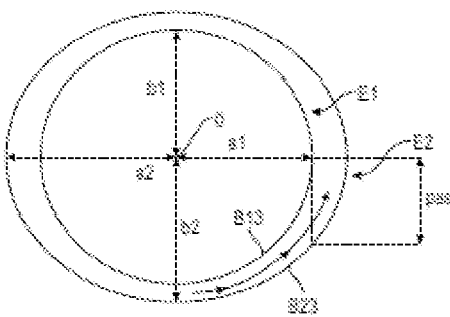
[Fig. 5b]
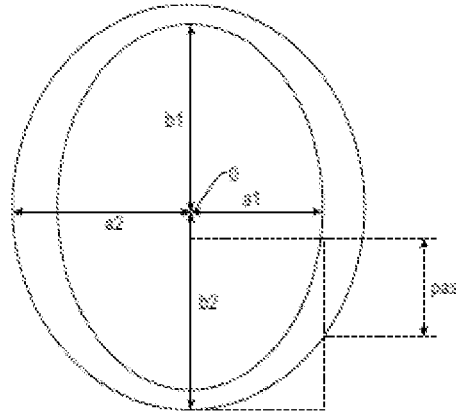

[Fig.6]
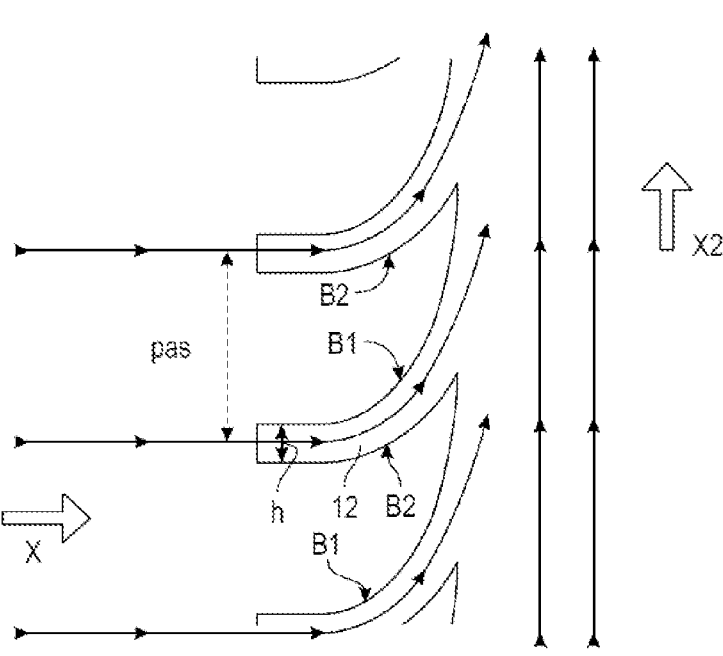
[Fig.7]
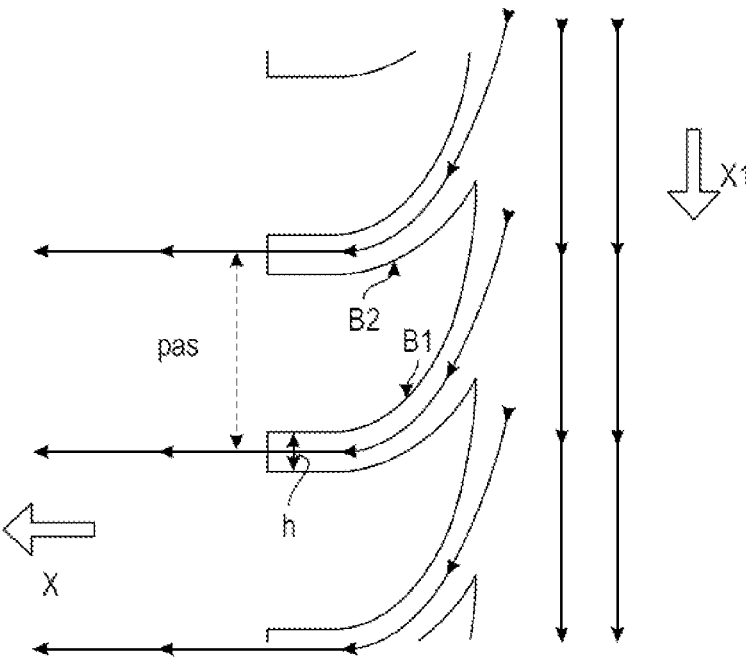

PLATE HEAT EXCHANGER COMPRISING PROFILED GUIDE ELEMENTS

TECHNICAL FIELD OF THE INVENTION

The present invention relates to a heat exchanger, in particular for a turbomachine.

TECHNICAL BACKGROUND

The technical background comprises in particular the documents US-A1-2019/285349, FR-A1-3 077 630, DE-A1-199 43 389, FR-A1-918 616, DE-A1-196 44 711, GB-A-634 608.

Conventionally, a turbomachine, in particular for an aircraft, comprises, from upstream to downstream in the orientation of the flowing of the gases, at least one compressor, a combustion chamber, at least one turbine and a nozzle. The compressor is configured to increase the pressure of the air, which is then delivered to the combustion chamber. In the combustion chamber, air is mixed with a fuel and burned. The combustion gases then pass through the turbine, which drives the compressor in rotation by collecting some of the pressure energy from the gases leaving the combustion chamber and converting it into mechanical energy. The nozzle ejects exhaust gases to produce a propulsion force for the turbomachine.

A heat exchanger is installed in a turbomachine to allow a transfer of thermal energy from one fluid towards another.

A heat exchanger can be used, for example, to transfer thermal energy from hot exhaust gases towards a gas intended to be introduced upstream of the combustion chamber, to the benefit in particular of the fuel consumption of the turbomachine. A heat exchanger can also be used to cool the lubricant, for example oil, of the means for guiding the rotors of the compressor and the turbine, the compressor and the turbine each consisting of a first set of stationary parts constituting a stator and a second set of parts, capable of being rotated relative to the stator, constituting a rotor.

For an equivalent aerothermal performance, the heat exchangers with fins are particularly used in the turbomachines because of their low mass.

Such a heat exchanger, between a first fluid, for example the hot exhaust gases, and a second fluid, for example the air, comprises circulation stages for the first fluid and circulation pathways of the second fluid formed between two consecutive circulation stages of the first fluid. A circulation stage of the first fluid comprises, for example, two parallel plates spaced apart so as to define a circulation passage for the first fluid and a series of fins arranged, for example, substantially perpendicularly between the plates.

FIGS. 1 and 2 show, respectively, an example of such a heat exchanger 1, and stages 2, 3 of such a heat exchanger. In this exchanger 1, a first fluid flows along a longitudinal direction, noted X, and a second fluid flows substantially perpendicular to the first fluid, along a direction noted Y. It should be noted that in other examples of such a heat exchanger, it may be provided for the first and second fluids to circulate in the core of the exchanger in countercurrent to each other along parallel directions. In this case, however, the directions of the two flows are designed to intersect substantially perpendicularly near the inlets and outlets of the exchanger, so that the two flows exit on different faces of the exchanger.

Each stage 2, 3 comprises two parallel plates 6 at a distance from each other, extending longitudinally along the direction X, so as to define a circulation passage 7 for the first fluid.

In order to partition the first fluid within the exchanger 1, each stage 2, 3 also comprises two outer partitions 5, arranged substantially perpendicular to the plates 6 and extending longitudinally along the direction X, so that the plates 5, 6 define the circulation passage 7. Each stage 2, 3 also comprises series of fins 9 arranged substantially perpendicularly between the plates 6, so as to define series of conduits in the circulation passages 7.

A circulation pathway 4 of the second fluid is provided between two circulation stages 2, 3 of the first fluid. In order to partition the second fluid within the exchanger 1, the exchanger 1 comprises plates 8, arranged substantially perpendicular to the plates 5, 6 and extending longitudinally in the direction Y, so that the plates 6, 8 define the circulation pathway 4. A row of fins 9 is arranged substantially perpendicularly between two circulation stages 2, 3 of the first fluid, so as to define a series of conduits in the circulation passage 4.

However, the heat exchanger 1 has an abrupt reduction of the cross-sections through which the first fluid passes at the inlet to the exchanger, and an abrupt increase of the cross-sections through which the first fluid passes at the outlet from the exchanger (see FIG. 2 for the outlet from the passages 7 and the evolution in the cross-sections S0, S1, S2 through which the first fluid passes).

The exchanger 1 is supplied with the first fluid by a distributor D which guides the first fluid from a flowing direction X1 substantially perpendicular to the direction X, up to the direction X to arrive at the inlet of the circulation passages 7. A manifold C guides the first fluid from the direction X up to a flowing direction X2 substantially perpendicular to the direction X. Similarly, the second fluid, circulating along the direction Y, can arrive on the plates 5 and be abruptly redirected towards the circulation pathways 4.

Due to the presence of plates 5, 8 and fins, the cross-sections of the circulation passages 7 and the circulations pathways 4 are smaller than the passage cross-sections of the fluids in the distributor D and the manifold C.

In addition, this abrupt reduction in the passage cross-sections of the fluids at the inlet of the exchanger and this abrupt increase in the passage cross-sections of the fluids at the outlet of the exchanger are all the greater the greater the variation of passage cross-sections of the fluids. More specifically, when there is a significant deviation between the heights of the passage cross-sections for the first and for the second fluids, i.e. between the heights of the fins 9 and the plates 5, 8, an abrupt reduction in the passage cross-sections for the fluids entering the exchanger and an abrupt increase in the passage cross-sections for the fluids leaving the exchanger may be encountered.

One of the disadvantages of this type of architecture is in particular that it results in a significant loss of energy, also referred to as pressure loss. In particular, this pressure loss may correspond to more than 20% of the total permitted pressure loss.

The reduction of this pressure loss is all the more important as the areas where it occurs contribute relatively little to the thermal exchange. In addition, a high pressure loss can lead to problems of inhomogeneous flowing distribution, which can reduce the performance of the exchanger. The deflection of the flowing at the inlet and outlet is not controlled or guided, resulting in an inhomogeneous distribution of the velocity within a given cross-section of the distributor D and of the manifold C.

Because of the severe constraints in terms of mass with iso-thermal performance, the aim of the present invention is to propose a heat exchanger with equivalent thermal performance and mass, with a reduction of its pressure loss.

In the application FR-A1-3 077 630, the applicant has already proposed a heat exchanger equipped with profiled elements at the inlet and outlet of the circulation passages for the first fluid. The applicant proposes an improvement to the technology described in this document.

SUMMARY OF THE INVENTION

To this end, the invention relates to a plate heat exchanger, in particular for an aircraft turbomachine, between a first fluid and a second fluid, the first fluid being intended to circulate along a first direction, and the second fluid being intended to circulate along a second direction different from the first direction, said exchanger comprising stacked stages for circulation of the first fluid, each stage comprising:

two parallel plates at a distance from each other, so as to define between them a passage for the circulation of the first fluid, a series of fins arranged substantially perpendicular at the level of each of the plates, so as to define a series of conduits for the circulation of the first fluid in said circulation passage, first profiled elements for the entry of the first fluid into said circulation passage, these first profiled elements being located at the level of each of the plates, at the entry to said passage, so as to define a first convergent path for guiding said first fluid in this passage, and/or second profiled elements for the outlet of the first fluid from said circulation passage, these second profiled elements being located at the level of each of the plates, at the outlet of said passage, so as to define a second divergent path for guiding said first fluid outside this passage, characterised in that each of said first and second profiles has a sawtooth shape in cross-section which comprises:

a first peripheral edge comprising a substantially straight first end for connection to one of the plates defining a first of said circulation passages, a second end located at a tip of the profiled element, and a convex curved portion extending between the first and second ends, a second peripheral edge comprising a substantially straight third end for connection to one of the plates defining a second of said circulation passages, adjacent to said first passage, a fourth end located at the tip of the profiled element and oriented substantially perpendicular to the third end, forming with the second end an angle of less than 90°, and a concave curved portion extending between the third and fourth ends, the concave and convex curved portions of said first and second profiles having different curvatures so as to define said first and second paths.

The aim of the invention is to significantly reduce pressure losses at the inlet and outlet of the circulation passages for the first fluid. This is made possible by the elements, which are profiled so as to ensure a progressive acceleration of the flowing at the inlet to the passages and a progressive deceleration of the flowing at the outlet. The elements are also profiled to introduce a progressive deflection of the flowing while gradually varying the cross-sectional area through which the fluid passes so as to avoid recirculation areas in this flowing. In particular, the invention allows to a significant reduction in pressure losses at iso-overall dimension, an improvement in the distribution of the flowing (homogenisation), and a reduction in the volume of the distributor and of the manifold of the exchanger at iso-losses of charges (because the deflection at 90° is much shorter with the guidance of the flow), which allows a better pressure resistance and reduces the mass of the distributor and of the manifold. The distributor and the manifold can be integrated into the exchanger or be independent parts fitted to the exchanger.

The heat exchanger according to the invention comprises one or more of the following characteristics, taken separately or in combination to each other:

the second end located at the tip of the profiled element is oriented substantially perpendicular to the first end;

the second end located at the tip of the profiled element forms an angle of between 60° and 95°, and preferably between 70° and 90°, with the first end;

the tips of the first and second profiled elements are tapered;

said first profiled elements are carried by a manifold fitted to the inlet of the plates, and said second profiled elements are carried by a distributor fitted to the outlet of the plates;

said first and second profiled elements are integrated with said plates;

the convex curved portion has a curvature corresponding to a quarter of an ellipse having a larger radius a1 at the level of the second end and a smaller radius b1 at the level of the first end, and the concave curved portion has a curvature corresponding to a portion, and for example a quarter, of an ellipse having a larger radius a2 at the level of the fourth end and a smaller radius b2 at the level of the third end, the ellipses having a same centre and a2 and b2 being respectively larger than a1 and b1;

said first profiled elements are all identical and said second profiled elements are all identical;

$$a_2 = a_1 + h \cdot R_d \qquad \text{[MATH1]}$$

where h is the distance between the plates and Rd is a parameter for controlling the variation in cross-section of the corresponding path.

$$b_2 = \frac{\text{pitch}}{\sqrt{1 - \left(\frac{a_1}{a_2}\right)^2}} \qquad \text{[MATH2]}$$

$$b_1 = b_2 - h \qquad \text{[MATH3]}$$

where pitch is the pitch between two adjacent circulation passages;

$$a_{1,n+1} = a_{1,n} + R_a \qquad \text{[MATH4]}$$

or $$a_{1,n+1} = a_{1,n} \cdot R_g \qquad \text{[MATH5]}$$

where Ra and Rg are the reasons for these sequences, arithmetic for the first and geometric for the second;

the fins are arranged substantially perpendicularly between said plates.

The invention also relates to a turbomachine comprising at least one heat exchanger as described above.

The invention also relates to a method for producing a heat exchanger according to the invention, the method comprising a step of producing said heat exchanger by additive manufacturing by selective melting on powder beds.

Advantageously, the method for producing a heat exchanger according to the invention by additive manufacturing using selective fusion on powder beds is simplified compared with the methods for manufacturing heat exchangers by brazing. In particular, it is less difficult to produce an exchanger according to the invention by additive manufacturing using selective fusion on powder beds than by brazing.

In addition, thanks to the method for producing an exchanger according to the invention, it is not necessarily necessary to have a particular support when producing said heat exchanger.

BRIEF DESCRIPTION OF THE FIGURES

Further characteristics and advantages of the invention will become apparent from the following detailed description, for the understanding of which reference is made to the attached drawings in which:

FIG. 1 is a schematic perspective view of a plate heat exchanger for an aircraft turbomachine, FIG. 2 is a very schematic view of the flowing of a first fluid at the outlet of a heat exchanger according to the prior art, FIG. 3 is a very schematic view of a manifold or distributor for a plate heat exchanger according to the invention, FIG. 4 is a larger-scale view of a portion of FIG. 3 and shows profiled elements of a heat exchanger, FIGS. 5a and 5b are diagrams showing examples of curvature for the profiled elements of the heat exchanger, FIG. 6 is a similar view to FIG. 4 and illustrates the flowing of the first fluid out of the exchanger, and FIG. 7 is a similar view to FIG. 4 and illustrates the flowing of the first fluid at the inlet of the exchanger.

DETAILED DESCRIPTION OF THE INVENTION

The invention relates to a heat exchanger 1, an example of which is shown in FIG. 1 and described in the foregoing. The above description therefore applies to a heat exchanger according to the invention.

In addition to the aforementioned characteristics, the exchanger 1 according to the invention comprises profiled elements 10 at the inlet and outlet of the passages 7, which are designed to optimise the deflection of the flowing of the first fluid while avoiding the appearance of recirculation areas and the generation of pressure losses.

FIG. 3 illustrates only one portion of a heat exchanger 1 according to the invention and more particularly one side of this exchanger, which corresponds here to a manifold C for the outlet of the first fluid from the aforementioned passages 7. The following description also applies to the distributor D which is mounted at the inlet of the passages to supply these passages 7 with the first fluid.

As mentioned above, the first fluid is collected by the passages 7 in the manifold C in the direction X and is diverted in the direction X2. In the distributor D, the first fluid flows in the direction X1 and is redirected in the direction X.

The profiled elements 10 can be carried by the manifold D or the distributor D and, for example, integrated or formed in one piece with the manifold or distributor. Alternatively, the profiled elements 10 can be provided directly at the ends of the plates 6 delimiting the passages 7 between them, and are then independent of the manifold C and of the distributor D.

The profiled elements 10 are located at the level of the plates 6 and have the function of defining converging paths for guiding the first fluid at the inlet to the passages 7, on the one hand, and diverging paths for guiding the first fluid at the outlet from the passages 7, on the other hand.

Each of the profiled elements 10 is located on a common side of two adjacent plates 6 and extends along this side. One of these plates 6 defines a first passage 7 and the other of these plates defines an adjacent passage 7. Each of the profiled elements 10 therefore has a generally elongated shape. Each of the profiled elements 10 has a general sawtooth shape in cross-section, as can be seen more clearly in FIG. 4.

The sawtooth shape comprises:

a first peripheral edge B1 comprising a first substantially straight end B11 for connection to a first of the plates 6 (defining a first circulation passage 7), a second end B12 located at a tip 14 of the profiled element 10 and oriented substantially perpendicular to the first end B11, and a convex curved portion B13 extending between the first and second ends B11, B12, a second peripheral edge B2 comprising a third substantially straight end B21 for connection to a second of the plates 6 (defining a second circulation passage 7 adjacent to the first passage), a fourth end B22 located at the tip 14 of the profiled element 10 and oriented substantially perpendicular to the third end B21, and a concave curved portion B23 extending between the third and fourth ends B21, B22.

The concave B13 and convex B23 curved portions of the profiles 10 have different curvatures so as to define the aforementioned converging and diverging paths 12.

As can be seen in FIG. 4, the tips 14 of the profiled elements 10 are all oriented in the same orientation and are tapered, i.e. as fine as possible. Their thickness is, for example, less than or equal to 0.5 mm.

The diagram in FIG. 5a illustrates the differences in curvature of the two portions B13 and B23 of the sawtooth shape of each profiled element 10.

The convex curved portion B13 has a curvature corresponding to a quarter, or even less, of an ellipse E1 having a larger radius a1 at the level of the second end B12 and a smaller radius b1 at the level of the first end B11.

The concave curved portion B23 has a curvature corresponding to a quarter of an ellipse E2 having a larger radius a2 at the level of the fourth end B23 and a smaller radius b2 at the level of the third end B21.

As can be seen in FIG. 5a, the ellipses E1 and E2 have the same centre O and the ellipse E2 is larger than the ellipse E1, i.e. a2 and b2 are respectively larger than a1 and b1.

In the example shown in FIGS. 3 to 7, which represents a first embodiment of the invention, the profiled elements 10 are all identical.

The following equations allow to calculate the values of a1, a2, b1 and b2 and are given as examples.

$$a_2 = a_1 + h \cdot R_d \qquad \text{[MATH1]}$$

where h is the distance between the plates 6 and therefore the height of the passages 7, as shown in FIG. 6, and Rd is a parameter controlling the variation in cross-section of the corresponding path 12.

$$b_2 = \frac{\text{pitch}}{\sqrt{1 - \left(\frac{a_1}{a_2}\right)^2}}$$ [MATH2]

$$b_1 = b_2 - h$$ [MATH3]

where pitch is the pitch between two adjacent passages 7, as shown in FIG. 6.

Alternatively, the profiled elements 10 are different and sized according to a predetermined arithmetic or geometric sequence.

$$a_{1,n+1} = a_{1,n} + R_a$$ [MATH4]

or $$a_{1,n+1} = a_{1,n} \cdot R_g$$ [MATH5]

with $Ra$ and $Rg$ the reasons for these sequences.

$$b_1 = b_2 - h$$ [MATH3]

The profiled elements 10 of the exchanger according to the invention can be produced by additive manufacturing using selective fusion on powder beds, for example. As mentioned above, these profiled elements 10 can be produced with the plates 6 when they are integrated with the plates 6, or produced with the manifold C or the distributor D when they are integrated with the latter.

FIG. 5b illustrates an alternative embodiment for the ellipses E1 and E2. They have the same centre O and the ellipse E2 is larger than the ellipse E1. b2 is larger than b1 but is larger than a1. a2 is larger than a1.

Furthermore, the framed portion of FIG. 5b shows that the area of interest chosen for the curvatures of the profiled elements is not necessarily a quarter of the large ellipse but can represent less than a quarter of an ellipse.

The invention claimed is:

1. A plate heat exchanger, in particular for an aircraft turbomachine, between a first fluid and a second fluid, the first fluid being intended to circulate along a first direction, and the second fluid being intended to circulate along a second direction different from the first direction, said exchanger comprising stacked stages for circulation of the first fluid, each stage comprising:

two parallel plates at a distance from each other, so as to define between them a passage for the circulation of the first fluid, a series of fins arranged between said plates, so as to define a series of conduits for the circulation of the first fluid in said circulation passage, first profiled elements for the entry of the first fluid into said circulation passage, these first profiled elements being located at the level of each of the plates, at the entry to said passage, so as to define a first convergent path for guiding said first fluid in this passage, and/or second profiled elements for the outlet of the first fluid from said circulation passage, these second profiled elements being located at the level of each of the plates, at the outlet of said passage, so as to define a second divergent path for guiding said first fluid outside this passage, wherein each of said first and second profiled elements has in cross-section a sawtooth shape which comprises:

a first peripheral edge comprising a substantially straight first end for connection to one of the plates defining a first of said circulation passages, a second end located at a tip of the first and second profiled elements, and a convex curved portion extending between the first and second ends, a second peripheral edge comprising a substantially straight third end for connection to one of the plates defining a second of said circulation passages adjacent to said first passage, a fourth end located at the tip of the first and second profiled elements and oriented at an angle of less than 90° to the second end, and a concave curved portion extending between the third and fourth ends, the concave and convex curved portions of said first and second profiled elements having different curvatures so as to define said first and second paths, and in that the convex curved portion has a curvature corresponding to a quarter of an ellipse having a larger radius a1 at the level of the second end and a smaller radius b1 at the level of the first end, and the concave curved portion has a curvature corresponding to a portion of an ellipse having a larger radius a2 at the level of the fourth end and a smaller radius b2 at the level of the third end, the ellipses having a same centre and a2 and b2 being respectively larger than a1 and b1.

2. The plate heat exchanger according to claim 1, wherein the second end located at the tip of the first and second profiled elements forms an angle of between 60° and 95°, with the first end.

3. The plate heat exchanger according to claim 2, wherein the tips of the first and second profiled elements are tapered.

4. The plate heat exchanger according to claim 1, wherein said first profiled elements are carried by a manifold fitted to the inlet of the plates, and said second profiled elements are carried by a distributor fitted to the outlet of the plates.

5. The plate heat exchanger according to claim 1, wherein said first and second profiled elements are integrated with said plates.

6. The plate heat exchanger according to claim 1, wherein said first profiled elements are all identical and said second profiled elements are all identical.

7. The plate heat exchanger according to claim 1, wherein $$a_2 = a_1 + h \cdot R_d$$

where h is the distance between the plates and Rd is a parameter controlling the variation in cross-section of the corresponding path.

8. The plate heat exchanger according to claim 7, wherein $$b_2 = \frac{\text{pitch}}{\sqrt{1 - \left(\frac{a_1}{a_2}\right)^2}}$$

$$b_1 = b_2 - h$$

where pitch is the pitch between two adjacent circulation passages.

9. The plate heat exchanger according to claim 1, wherein $$a_{1,n+1} = a_{1,n} + R_a$$

$$a_{1,n+1} = a_{1,n} \cdot R_g$$

where Ra is the common difference for said arithmetic sequence and Rg is the common ratio for said geometric sequence.

10. The plate heat exchanger according to claim 1, wherein the second end located at the tip of the first and second profiled elements is oriented substantially perpendicular to the first end.

11. The plate heat exchanger according to claim 1, wherein the fins are arranged substantially perpendicularly between said plates.

12. A turbomachine comprising at least one plate heat exchanger according to claim 1.

13. The plate heat exchanger according to claim 12, wherein the second end located at the tip of the first and second profiled elements forms an angle of between 70° and 90°, with the first end.

14. The plate heat exchanger according to claim 13, wherein the tips of the first and second profiled elements are tapered.

\* \* \* \* \*